L. W. GRISWOLD.
HEAT CONTROLLER FOR AIR COOLED ENGINES.
APPLICATION FILED MAR. 29, 1917.
1,257,218.
Patented Feb. 19, 1918.
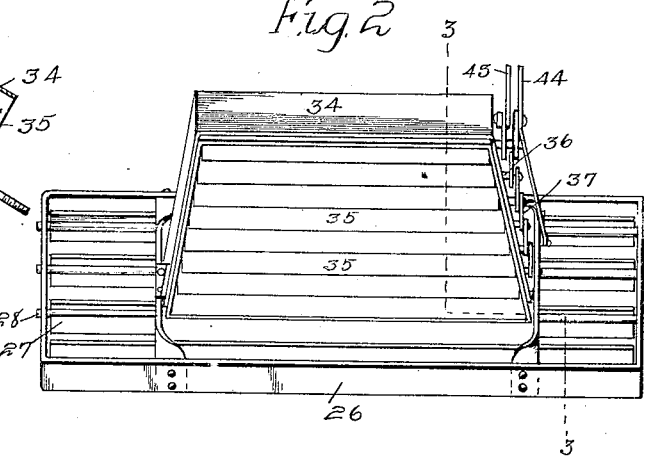
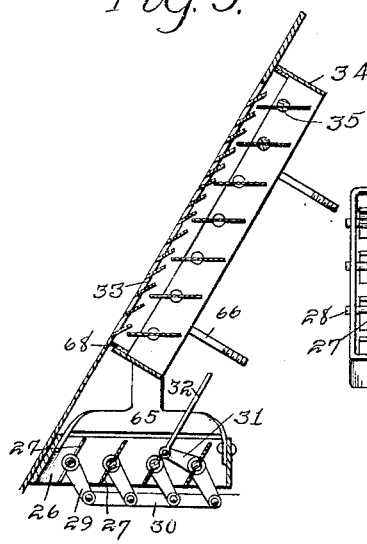
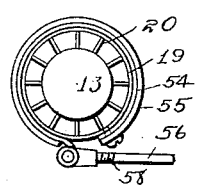
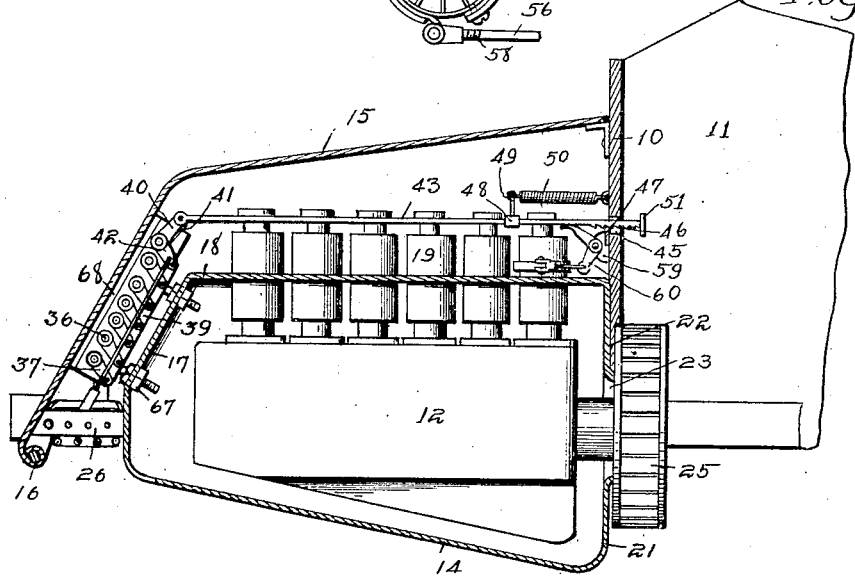
Witness
Al. Hague.
Inventor
Leslie W. Griswold
by Orwig & Bair attys

UNITED STATES PATENT OFFICE.

LESLIE W. GRISWOLD, OF COOPER, IOWA.

HEAT-CONTROLLER FOR AIR-COOLED ENGINES.

1,257,218.  Specification of Letters Patent.  Patented Feb. 19, 1918.

Application filed March 29, 1917. Serial No. 158,460.

*To all whom it may concern:*

Be it known that I, LESLIE W. GRISWOLD, a citizen of the United States, and resident of Cooper, in the county of Greene and State of Iowa, have invented a certain new and useful Heat-Controller for Air-Cooled Engines, of which the following is a specification.

The object of my invention is to provide an air control device for air cooled engines of simple, durable and inexpensive construction.

More particularly it is my object to provide an air control device especially adapted for use on motor vehicles, such, for instance, as the Franklin car.

Still a further object is to provide such a device capable of adjusting the amount of air passing the cylinders for cooling the engine.

Still a further object is to provide such a device having closure devices, and means for accurately controlling said closure devices for setting them in a variety of positions.

Still a further object is to provide in such a device, means for automatically opening the closure device when the heat of the engine reaches a certain temperature.

With these and other objects in view my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a vertical, sectional view through the dash and hood of an automobile equipped with my improved air controlled device.

Fig. 2 shows a top or plan view of the same, the hood being removed.

Fig. 3 shows a vertical, sectional view taken on the line 3—3 of Fig. 2, and

Fig. 4 shows a top or plan view of one of the cylinders showing part of the automobile control device thereon.

In the accompanying drawings I have used the reference numeral 10 to indicate generally the dash of a motor vehicle, having the body 11.

At the forward end of the motor vehicle is the engine having the crank casing 12 and the cylinders 13. Below the engine is the ordinary casing member 14 for inclosing an engine of the air cooled type, and above the engine is a hood 15 pivoted at its lower end at 16 to tilt upwardly and forwardly.

The casing member 14 has an upward extension 17 located inwardly of the forward portion of the hood 15 and connected with a horizontal partition member 18, through which the cylinders 13 are extended. The partition 18 divides the space between the hood 15 and casing member 14 into two compartments.

The cylinders 13 are provided with spaced jackets 19 and with vanes or partitions 20 between the bodies of the cylinders and said jackets.

At the rear end of the casing member 14 is an upward extension 21, and at the rear end of the partition 18 is a downward extension 22. The members 21 and 22 form the rear end of the casing for the engine, and they have a central opening 23 communicating with an air pump 24 for drawing air through the compartments above and below the partition 18 and downwardly between the cylinders 13 and the jackets 19.

My improved air control device comprises a substantially rectangular frame 26 arranged forwardly of the extension 17 at the lower portion thereof, and between the extension 17 and the lower forward portion of the hood, as illustrated in Figs. 1 and 3.

Arranged transversely of the machine between the ends of the frame 26 and spaced from each other, is a plurality of shutter members or blades 27. The blades or shutter members 27 may be mounted in any suitable way for permitting their movement for opening or closing the space between the frame members.

The shutter members 27 may be provided with spindles 28 at their ends rotatably mounted in the end members of the frame 26.

Operatively connected with each shutter member 27 is a downwardly extending lever arm 29, shown in Fig. 3. A link 30, arranged in substantially horizontal position longitudinally of the machine, is pivoted to the ends of all of the arms 29, as illustrated in Fig. 3.

Operatively connected with one of the shutter members 27 is an upwardly and forwardly extending arm 31 to which is pivoted an upwardly extending link 32. The hub 15 is provided at its forward end with a plurality of air openings 33.

Just rearwardly of the forward end of the hood is mounted a frame 34 having top and end members. A plurality of shutter members 35 are arranged within the outline of the frame 34 transversely of the machine and are spaced from each other, as illustrated in Fig. 3.

The shutter members 35 may be mounted in any suitable way for permitting their rotation, and as shown are provided with laterally extending spindles 36 rotatably mounted in the end of the members of the frame 34.

Operatively connected with each shutter member 35 is a downwardly and rearwardly extending arm 37. A link 39 is pivotally connected with all of the arms 37.

Operatively connected with the upper shutter member 35 is a pair of upwardly extending arms 40 and 41. Operatively connected with the upper shutter member 35 is a downwardly and rearwardly extending arm 42, pivotally connected with the upper end of the link 32.

The arms 40 and 41 are pivoted to links 43 and 44 rearwardly in the machine, as shown in Figs. 1 and 2. Each link 43 and 44 has its rear end extended through an opening 45 in the dash 10, and is provided on its lower surface with a plurality of teeth 46 to coact with a plate 47 mounted on the dash. The teeth 46 and plate 47 are so arranged that when the links 43 and 44 are in position with the plate 47 engaged by the teeth 46, the rearward movement of the links 43 and 44 is prevented.

Secured to each link 43 and 44 is a collar 48 having an upwardly extending arm 49 to which is secured a coil spring 50 extending forwardly in the machine and secured at its forward end to the dash 10.

The springs 50 normally hold the links 43 and 44 at the rearward positions of their movement. The parts are so arranged that when said links are in such rearward position, the shutter members 35 and 27 are open.

On the rear ends of the links 43 and 44 are heads 51. By pushing the links 43 and 44 forwardly in the machine, the shutter members 25 and 27 may be moved to closed position and will be held in such position by means of the engagement of the plate 47 with the teeth 46, until the rear ends of the links 43 and 44 are raised to release the teeth from engagement with such plate.

It will be seen that because there are a variety of teeth 46 on each link 43 and 44, the shutter members may be set in a variety of positions.

Thus it is quite possible to accurately regulate the flow of fresh air between the cylinders 13 and their jackets 19, for thereby regulating the cooling of the engine.

Thus it is possible, if desired, to entirely close the shutter members 35 and to leave the shutter members 27 in open position for limiting the amount of air passing through the compartments above and below the partition 18 and between the engine cylinders and their jackets 19.

Another very important advantage of my air controlling device arises from the fact that by closing all of the shutter members, the circulation of air around the engine beneath the hood can be prevented. This is very important in cold weather for the reason that air cooled engines of this type cool off very rapidly when the car is stopped and make it very difficult to start the engine. By retaining the heated air beneath the hood it takes considerably longer for the engine to cool off.

In order to avoid any difficulty which might arise due to the fact that the driver of the car might forget to open the shutter members after having been closed, I have provided means for automatically opening said shutter members when the cylinder jackets reach a certain temperature.

I provide a thermostat comprising a pair of strips 54 and 55 secured together and to one of the jackets 19 at one end. These strips are made of two different kinds of metal, as for instance, copper and iron. The inner strip 15 is connected with a link 56 by means of a socket 57 which is screw-threaded and is screwed on to the screw-threaded end of the link 56 to permit adjustment. The socket 57 is pivoted to the strip 54.

Centrally pivoted on a bracket 59, preferably on the dash 10, is a bell-crank lever 60, one end of which is pivoted to the link 56. The other end of the bell-crank lever rests beneath both of the links 43 and 44.

When the engine is cooled, the thermostat comprising the strips 54 and 55 stands in such position that the upper arm of the bell crank lever 60 permits the links 43 and 44 to remain in their lower positions with their teeth engaging the plate 47. When, however, the cylinder jacket on which the thermostat is mounted is heated to a certain predetermined temperature, the thermostat will move the link 56 for operating the bell crank lever 60 for causing its upper arm to engage and raise the links 43 and 44 until the teeth 46 move out of engagement with the plate 47, whereupon the springs 50 will move the links 43 and 44 for opening the shutter members.

It should be mentioned in this connection that the adjustment of the socket 57 on the link 56 is provided so that the parts may be adjusted for controlling the bell-crank lever 60 at different predetermined temperatures.

The advantages of this construction are largely seen from the foregoing description.

The frames 26 and 34 are rigidly connected together by means of frame members 65. Any suitable means may be provided for mounting the frame containing the closure devices on the machine, but I have provided on the frame 34 a plurality of bolts 66, which as shown, are extended through the member 17 and receive suitable nuts for securely fastening the frames to the casing member 17.

Secured to the frame 34 at the forward portion thereof is a packing strip 68 extending forwardly from the frame 34, and adapted to engage the forward portion of the hood for preventing the passage of air through the openings 33 and around the frame 34.

Some changes may be made in the construction and arrangement of the various parts of my improved air controlled device without departing from the essential features and purposes of my invention, and it is my intention to cover by the patent to be issued upon my application, any modified forms of structure or use of mechanical equivalents, which may be reasonably included within the scope of my claims.

I claim as my invention:

1. A heat controller for air cooled engines comprising a frame having a portion designed to fit adjacent to an opening in the front wall of an automobile hood and having another portion adapted to fit adjacent to an opening below said first opening, said portions lying in substantially different planes, shutter closure devices supported by said different portions of said frame, and means for operating said shutter closure devices.

2. A heat controller for air cooled engines comprising a frame having a portion designed to fit adjacent to an opening in the front wall of an automobile hood and having another portion adapted to fit adjacent to an opening below said first opening, said portions lying in substantially different planes, shutter closure devices supported by said different portions of said frame, means for operating said shutter closure devices, and means for operating the lower closure device including the pivoted member on the upper portion of said frame.

Des Moines Iowa, March 19, 1917.

LESLIE W. GRISWOLD.